(12) United States Patent
Onsen

(10) Patent No.: US 9,516,216 B2
(45) Date of Patent: Dec. 6, 2016

(54) DISPLAY PROCESSING APPARATUS AND METHOD

(71) Applicant: CANON KABUSHIKI KAISHA, Tokyo (JP)

(72) Inventor: Takahiro Onsen, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/684,485

(22) Filed: Apr. 13, 2015

(65) Prior Publication Data

US 2015/0296131 A1 Oct. 15, 2015

(30) Foreign Application Priority Data

Apr. 14, 2014 (JP) ................. 2014-083104

(51) Int. Cl.
*H04N 5/225* (2006.01)
*H04N 5/232* (2006.01)

(52) U.S. Cl.
CPC ...... *H04N 5/23216* (2013.01); *H04N 5/23206* (2013.01); *H04N 5/23238* (2013.01); *H04N 5/23293* (2013.01)

(58) Field of Classification Search
CPC ............ H04N 5/23216; H04N 5/23238; H04N 5/23206; H04N 5/23293; H04N 5/232; H04N 5/23296; H04N 5/2628; H04N 5/3454

USPC .................. 348/207.1, 207.11, 552
See application file for complete search history.

(56) References Cited

U.S. PATENT DOCUMENTS 8,085,300 B2 * 12/2011 Ikeda ............... G08B 13/19689
348/150
2002/0180878 A1 12/2002 Iida et al.

FOREIGN PATENT DOCUMENTS

JP 2006101118 A 4/2006
JP 2009303179 A 12/2009

* cited by examiner

*Primary Examiner* — Yogesh Aggarwal
(74) *Attorney, Agent, or Firm* — Rossi, Kimms & McDowell LLP

(57) ABSTRACT

A display processing apparatus for displaying, on a display unit, an image captured by an image capture apparatus capable of changing an image capture direction performs first display processing in which an image captured by the image capture apparatus is displayed in a first region of the display unit while the image capture direction is changed, and performs second display processing in which, in a second region indicating a range in which the image capture apparatus can perform image capture by changing the image capture direction, display according to the image capture direction in which the received image was captured is performed.

20 Claims, 11 Drawing Sheets

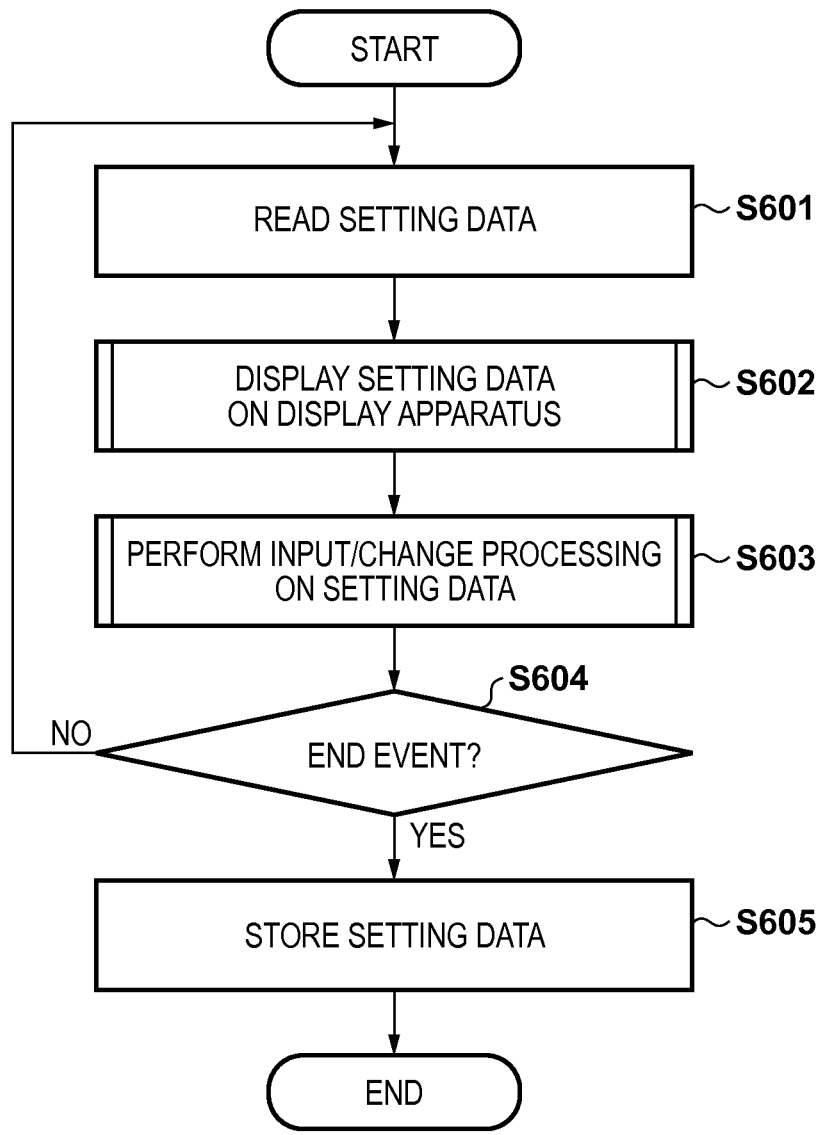

FIG. 7

| PRESET NUMBER | PAN | TILT | ZOOM | PAUSE | PRESET TOUR ATTRIBUTE |
|---|---|---|---|---|---|
| | | | | | TOUR |
| 1 | 0 | 45 | 30 | 3 | 1 |
| 2 | 100 | 10 | 30 | 5 | 3 |
| 3 | 170 | 80 | 20 | 10 | 2 |
| 4 | -170 | 20 | 15 | 2 | 4 |
| 5 | | | | | |
| 6 | | | | | |
| 7 | | | | | |
| 8 | | | | | |
| 9 | | | | | |

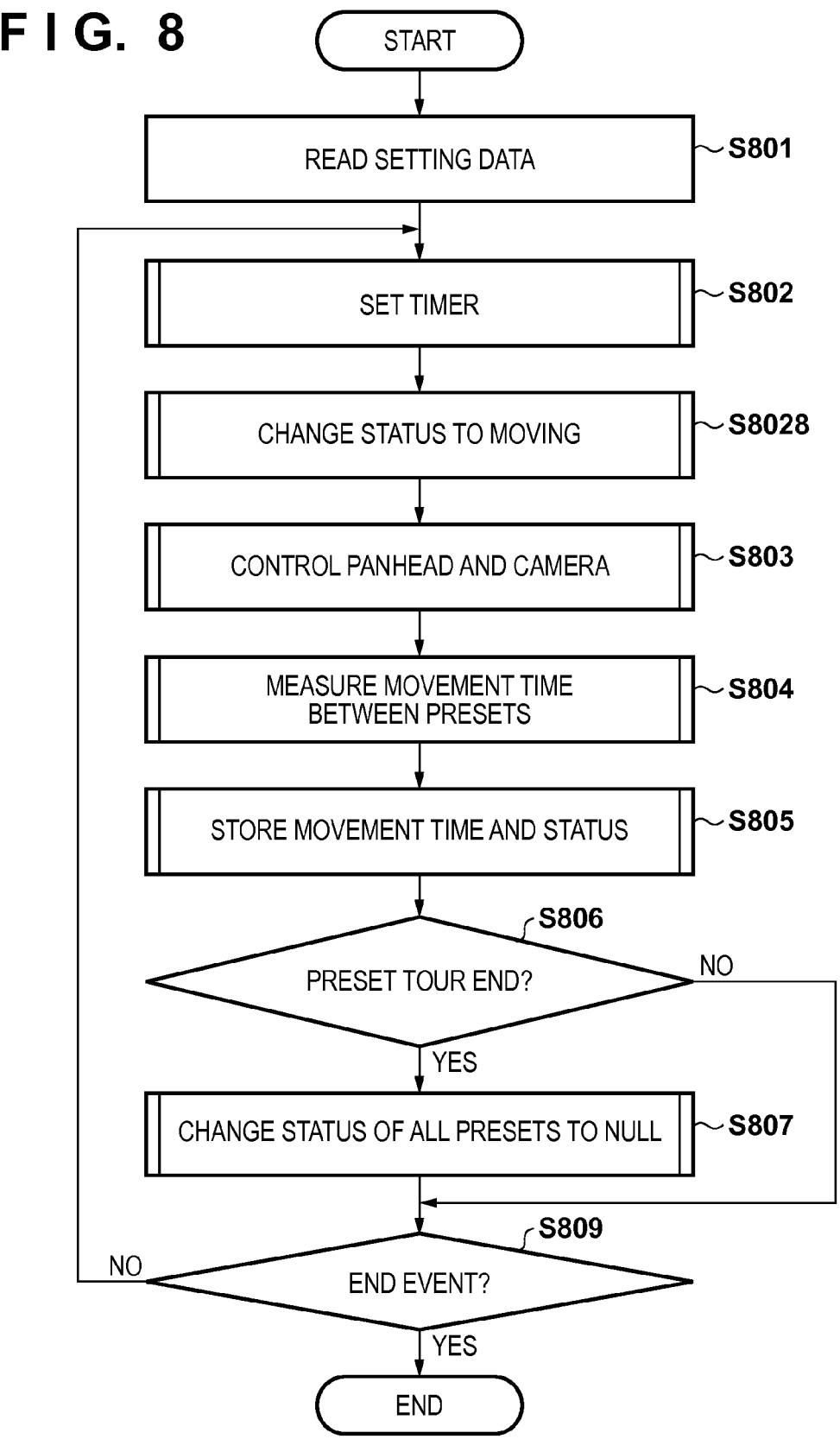

| TOUR ORDER | PRESET NUMBER | MOVEMENT TIME (SECONDS) | STATUS |
|---|---|---|---|
| 1 | 1 | 10 | F |
| 2 | 3 | 10 | N |
| 3 | 2 | 5 | NULL |
| 4 | 4 | 15 | NULL |
| 5 | | | |
| 6 | | | |
| 7 | | | |
| 8 | | | |
| 9 | | | |

| TOUR ORDER | PRESET NUMBER | MOVEMENT TIME (SECONDS) | STATUS |
|---|---|---|---|
| 1 | 1 | 10 | F |
| 2 | 3 | 10 | S |
| 3 | 2 | 5 | N |
| 4 | 4 | 15 | NULL |
| 5 | | | |
| 6 | | | |
| 7 | | | |
| 8 | | | |
| 9 | | | |

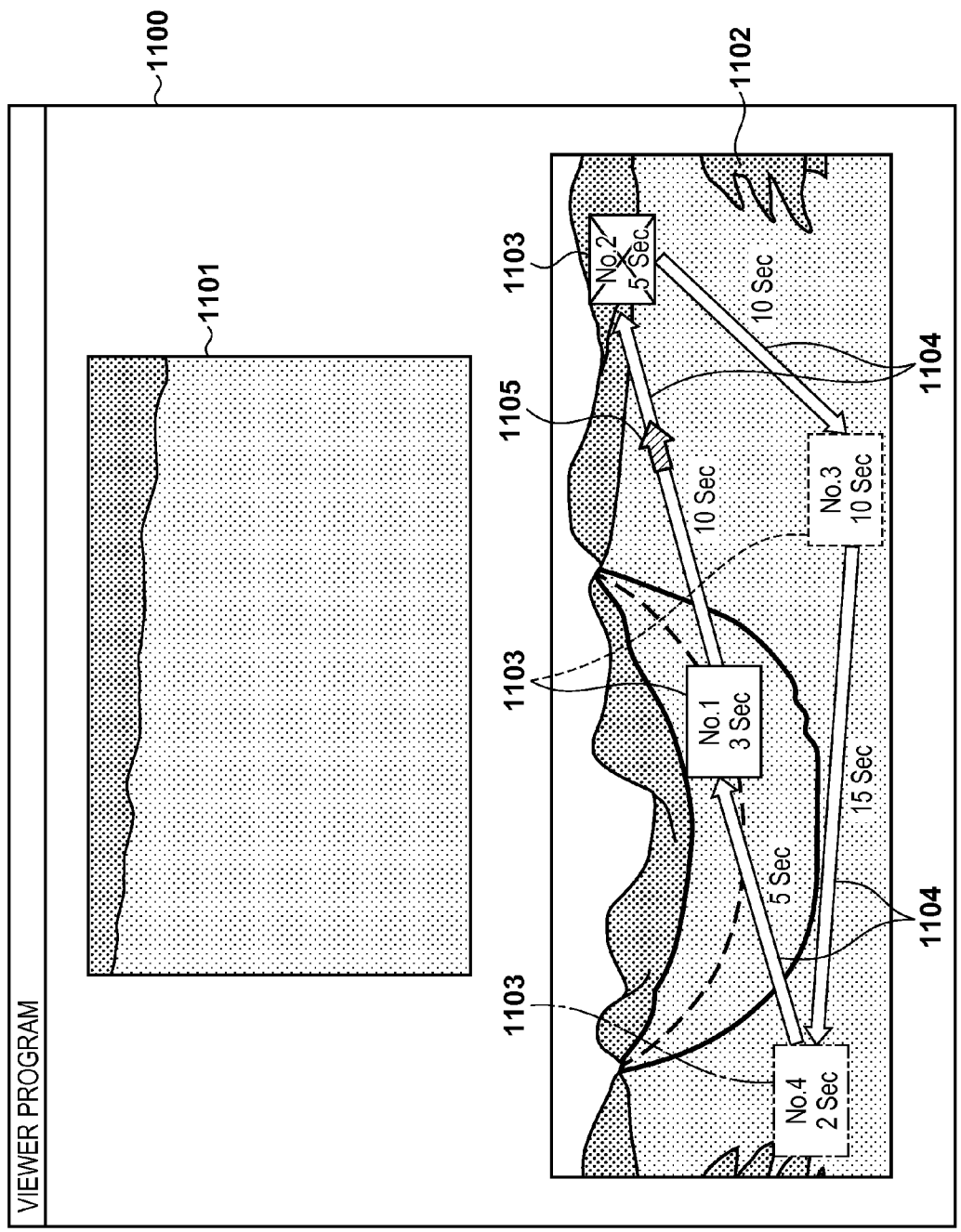

DISPLAY PROCESSING APPARATUS AND METHOD

BACKGROUND OF THE INVENTION

Field of the Invention

The present invention relates to a display processing apparatus and method, for displaying a captured image.

Description of the Related Art

In recent years, network cameras have been used not only in monitoring applications, but in various types of applications, such as Webcasting, and TV conferences. Not only fixed-type cameras, but also cameras according to which pan, tilt, and zoom (abbreviated below as "PTZ" as needed) adjustment is possible have become widespread as network cameras.

Furthermore, a preset function according to which multiple pre-set types of PTZ are stored as presets, and functions known as preset tour, auto patrol, guard tour, and the like, which operate so as to capture images in order at positions indicated by the multiple presets (preset positions), have also been realized so that monitoring camera systems can be set up more easily.

Among cameras that include the preset function, as disclosed in Japanese Patent Laid-Open No. 2006-101118, there exists a camera that includes a function of displaying, on a display screen, a preset selection switch that can be selected by a user, and displaying an image (still image) captured at a preset position, in an area below the preset selection switch.

A person in charge of monitoring a monitoring camera system executes a task of monitoring by using a viewer program to view an image captured using a camera on a display apparatus. In this type of monitoring camera system, when a camera performs a preset tour, the captured image displayed on the display apparatus by the viewer program changes from moment to moment. This is problematic in that by merely viewing the captured image being displayed, the person in charge of monitoring cannot determine what kind of image capture conditions (image capture position, etc.) the captured image was captured under, and the tour status of the camera cannot be understood in some cases.

SUMMARY OF THE INVENTION

The present invention provides a display processing apparatus and method, according to which it is possible to easily understand an image capture status.

It is an object of the present invention to provide a display processing apparatus for displaying, on a display unit, an image captured by an image capture apparatus capable of changing an image capture direction, the apparatus including: a reception unit configured to receive an image captured by the image capture apparatus from the image capture apparatus while an image capture direction is being changed; and a processing unit configured to perform first display processing in which the image received by the reception unit is displayed in a first region of the display unit, and second display processing in which display according to the image capture direction in which the received image was captured is performed in a second region indicating a range in which the image capture apparatus can perform image capture by changing the image capture direction.

It is also an object of the present invention to provide a display processing apparatus for displaying, on a display unit, an image captured by an image capture apparatus capable of changing an image capture direction, the apparatus including: an obtaining unit configured to obtain data for an image capture order of a plurality of image capture ranges performed by the image capture apparatus; and a processing unit configured to, based on the data for image capture order, in a region indicating a range in which the image capture apparatus can perform image capture by changing the image capture direction, perform display processing for providing a first display according to a first image capture range among the plurality of image capture ranges, a second display according to a second image capture range in which an image is captured subsequent to the first image capture range, and third display that indicates that the image capture direction is changed from an image capture direction for performing image capture in the first image capture range to an image capture direction for performing image capture in the second image capture range.

Further features of the present invention will become apparent from the following description of exemplary embodiments with reference to the attached drawings.

BRIEF DESCRIPTION OF THE DRAWINGS

FIG. 6 is a flowchart showing processing performed by a setting program.

FIG. 7 is a diagram showing an example of setting data.

FIG. 8 is a flowchart showing processing for a preset tour program.

FIGS. 9A and 9B are diagrams showing an example of preset tour data.

FIG. 13 is a diagram showing an example of a viewer dialog box.

DESCRIPTION OF THE EMBODIMENTS

Hereinafter, embodiments of the present invention will be described in detail with reference to the drawings.

Figure 1:
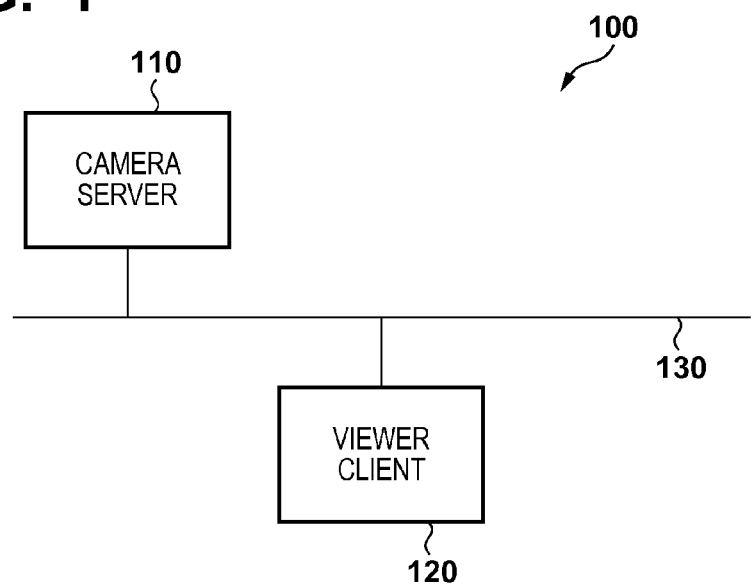
FIG. 1 is a diagram showing an example of an overall configuration of a monitoring camera system.

FIG. 1 is a diagram showing an example of an overall configuration of a monitoring camera system. As shown in FIG. 1, a monitoring camera system 100 includes a camera server 110, a viewer client 120, and a network 130. The camera server 110 and the viewer client 120 are mutually connected via the network 130.

The camera server 110 includes a camera (e.g., a network camera) with variable image capture conditions (image capture angle of view and zoom position) as an image capture apparatus. Also, the camera server 110 can transmit image data for images captured using the camera to the viewer client 120 via the network 130.

The viewer client 120 is constituted by a personal computer, for example, and accesses the camera server 110 to change camera settings, processes image data for captured images obtained using the camera, or processes image data accumulated in the viewer client 120 so as to perform display of an image based on the image data resulting from processing.

Note that in FIG. 1, only the viewer client 120 is shown as a client in the monitoring camera system 100, which is an image capture control system, but there is no limitation to this. That is to say, a configuration is possible in which another client that accesses the camera server 110 to receive and accumulate image data is included in the monitoring camera system 100 in addition to the viewer client 120.

The network 130 is a medium according to which the camera server 110 and the viewer client 120 are communicably connected, and for example, it is constituted by multiple routers, switches, cables, and the like that satisfy a communication standard such as Ethernet (registered trademark). Note that in the present embodiment, as long as the network 130 can be used to perform communication between the camera server 110 and the viewer client 120 without difficulty, any communication standard, scale, and configuration may be used therein. Accordingly, anything from the Internet to a LAN (Local Area Network) can be applied as the network 130. Also, there is no limitation to wired or wireless types.

Figure 2:
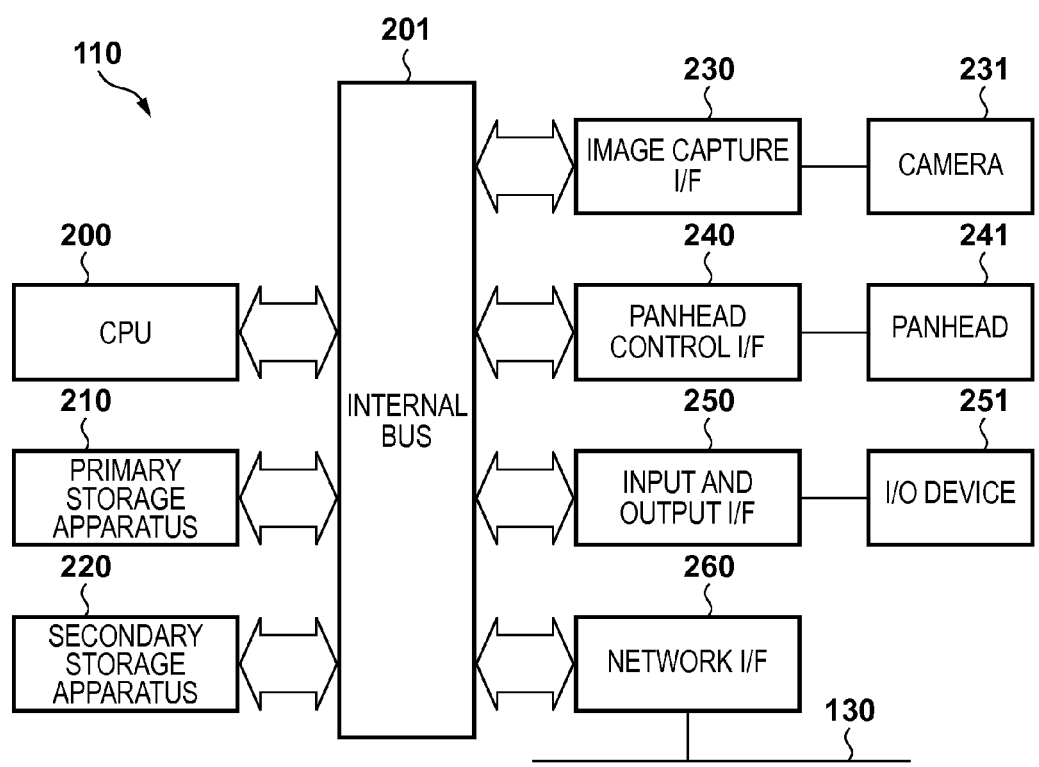
FIG. 2 is a block diagram showing an example of an internal configuration of a camera server.

FIG. 2 is a block diagram showing an example of an internal configuration of the camera server 110.

An internal bus 201 is included in the camera server 110. Also, the camera server 110 includes a CPU 200, a primary storage apparatus 210, a secondary storage apparatus 220, an image capture I/F 230, a panhead control I/F 240, an input and output I/F 250, and a network I/F 260. Also, the various constituent elements of the camera server 110 are mutually connected via the internal bus 201. Also, the camera server 110 has a camera 231 that is connected to the image capture I/F 230, a panhead 241 that is connected to the panhead control I/F 240, and an input and output device (I/O device) 251 that is connected to the input and output I/F 250.

The CPU 200 performs overall control of the operations of the camera server 110. The primary storage apparatus 210 is a writable high-speed storage apparatus represented by a RAM, for example. An OS (operating system), various programs, and various types of data are loaded in the primary storage apparatus 210, and the primary storage apparatus is also used as a work region for when the CPU 200 executes the OS and the various programs. The secondary storage apparatus 220 is a non-volatile storage apparatus represented by, for example, an FDD, an HDD, a flash memory, a CD-ROM drive, or the like. In addition to being used as a permanent storage region for an OS, various programs, and various types of data, the secondary storage apparatus 220 is also used as a temporary storage region for various types of data.

The image capture I/F 230 converts/compresses image data for an image captured using the camera 231 into a predetermined format (e.g., JPEG format, etc.) and transfers it to the secondary storage apparatus 220 (may be the primary storage apparatus 210), for example. The camera 231 is an image capture unit configured such that image capture conditions (image capture angle of view and zoom position) are variable. The panhead 241 (pan function, tilt function, and zoom function), which is mounted in the camera 231 and is movable, is connected to the panhead control I/F 240. The panhead control I/F 240 receives commands from the CPU 200 so as to control the panhead 241 and control image capture conditions (image capture position) such as the pan angle, tilt angle, and zoom value of the camera 231.

The input and output I/F 250 receives signals/interruptions from an external device and outputs signals to the external device via the I/O device 251. The I/O device 251 is, for example, a door opening and closing sensor, a siren, or the like. The network I/F 260 is an interface for connecting to the network 130, and performs communication with an information processing apparatus such as the viewer client 120 via that network 130.

Figure 3:
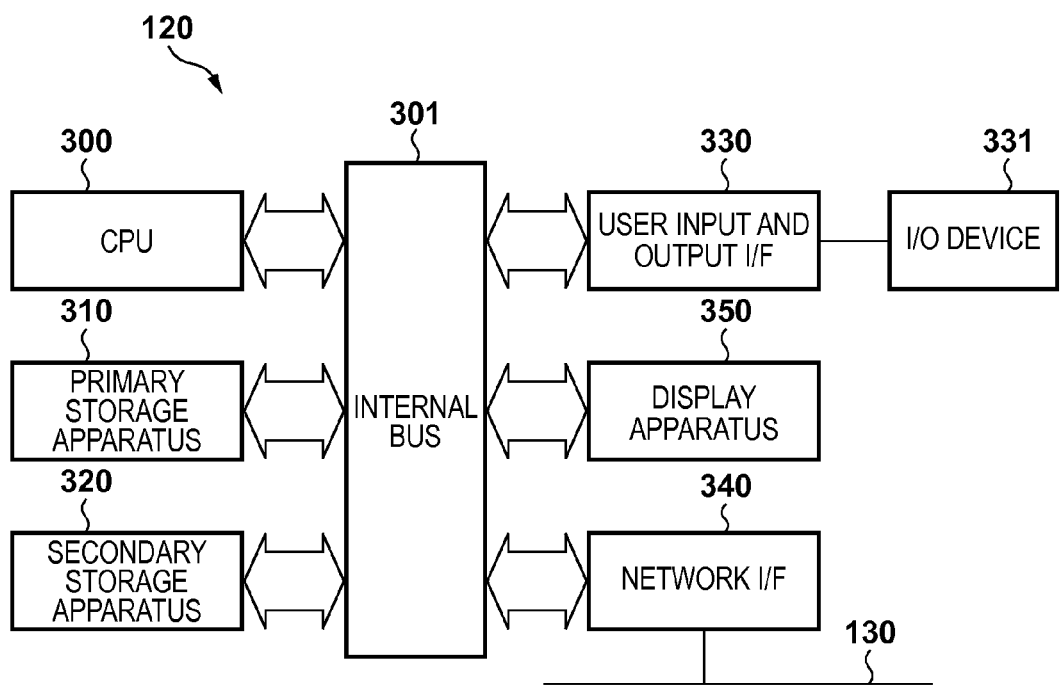
FIG. 3 is a block diagram showing an example of an internal configuration of a viewer client.

FIG. 3 is a block diagram showing an example of an internal configuration of the viewer client 120.

An internal bus 301 is included in the viewer client 120. Also, the viewer client 120 includes a CPU 300, a primary storage apparatus 310, a secondary storage apparatus 320, a user input and output I/F 330, a display apparatus 350, and a network I/F 340. Also, the various constituent elements of the viewer client 120 are mutually connected via the internal bus 301. Also, the viewer client 120 has an input and output device (I/O device) 331 that is connected to the user input and output I/F 330.

The CPU 300 performs overall control of the operations of the viewer client 120. The primary storage apparatus 310 is a writable high-speed storage apparatus represented by a RAM, for example. An OS, various programs, and various types of data are loaded in the primary storage apparatus 310, and the primary storage apparatus 310 is also used as a work region for when the CPU 300 executes the OS and the various programs, for example. The secondary storage apparatus 320 is a non-volatile storage apparatus represented by, for example, an FDD, an HDD, a flash memory, a CD-ROM drive, or the like. In addition to being used as a permanent storage region for an OS, various programs, and various types of data, the secondary storage apparatus 320 is also used as a temporary storage region for various types of data.

The user input and output I/F 330 receives input from and performs output to the user via the I/O device 331. The I/O device 331 is, for example, an input and output device constituted by a keyboard, a mouse, and a speaker. The network I/F 340 is an interface for connecting to the network 130, and performs communication with an information processing apparatus such as the camera server 110 via the network 130. The display apparatus 350 is an image display device such as a display that displays images based on image data for a captured image on the camera server 110.

Figure 4A:
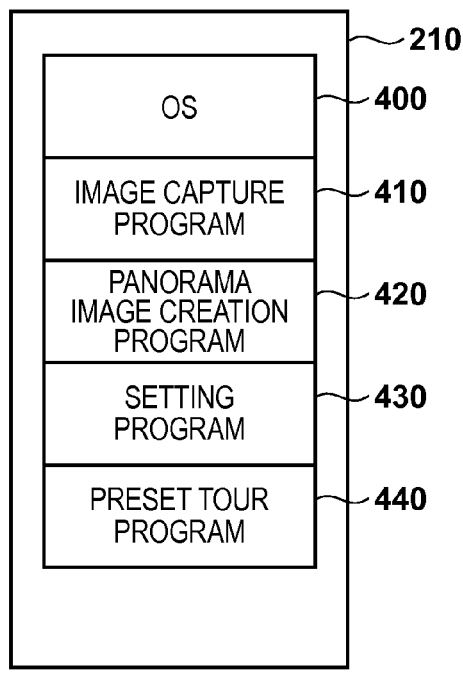
FIGS. 4A and 4B are diagrams showing an example of various types of programs and various types of data of a camera server.
Figure 4B:
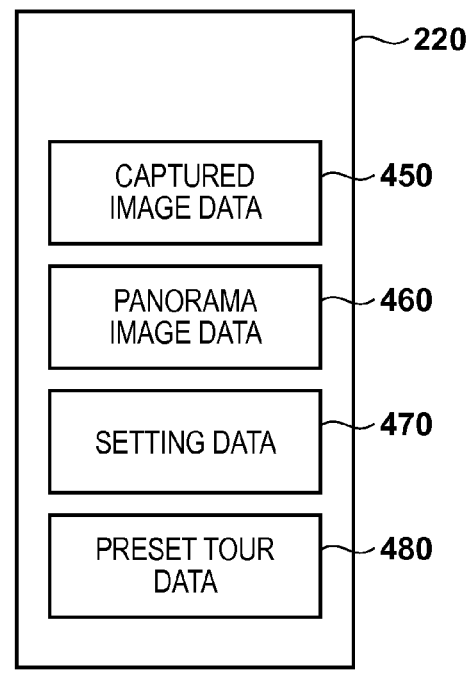

FIGS. 4A and 4B are diagrams showing an example of various types of programs and various types of data stored in the primary storage apparatus 210 and the secondary storage apparatus 220 of the camera server 110. FIG. 4A shows various types of programs stored in the primary storage apparatus 210 of the camera server 110, and FIG. 4B shows various types of data stored in the secondary storage apparatus 220 of the camera server 110.

In FIG. 4A, an OS 400, an image capture program 410, a panorama image creation program 420, a setting program 430, and a preset tour program 440 are loaded in the primary storage apparatus 210. Note that the panorama image creation program 420, the setting program 430, and the preset tour program 440 do not necessarily need to be in the primary storage apparatus 210 of the camera server 110. For example, as will be described later, they may be in the primary storage apparatus 310 of the viewer client 120.

The OS 400 is a basic program for performing overall control of the camera server 110. Here, the positions (addresses) in the primary storage apparatus 210 and sizes of various programs (410 to 440) are managed by the OS 400.

An image capture program 410 performs image capture by means of the camera 231 and processes the captured image in the camera 231 based on a received event. For example, upon receiving an image capture end event from the camera 231, the image capture program 410 obtains the image data for the captured image in the camera 231 via the image capture I/F 230. Then, the image capture program 410 converts/compresses the obtained image data into a predetermined format and stores (accumulates) it in the secondary storage apparatus 220 as captured image data 450. Also, upon receiving a transmission request event via the network 130 from the viewer client 120, which is an external apparatus, the image capture program 410 transmits the captured image data 450 stored in the secondary storage apparatus 220 to the viewer client 120.

In this way, by receiving various types of events for processing the captured image data 450, the image capture program 410 performs processing from image capture by means of the camera 231 of the camera server 110 to transmission of image data via the network 130.

The panorama image creation program 420 uses the captured image data 450 stored in the secondary storage apparatus 220 to create image data (panorama image data) for all directions (e.g. 360 degrees) or a predetermined range in which the camera 231 can perform image capture, centered about any designated orientation. At this time, for example, the panorama image creation program 420 can create panorama image data centered about an origin (0 degrees), or panorama image data centered about the angle that the camera 231 is currently facing. Alternatively, the panorama image creation program 420 can create panorama image data centered about the center of gravity of multiple preset points.

Then, the panorama image creation program 420 stores (accumulates) the created panorama image data as panorama image data 460 in the secondary storage apparatus 220.

The setting program 430 generates setting data for the preset tour program 440, which includes preset position information, and tour route information for allowing touring of multiple presets. Then, the setting program 430 stores (accumulates) the generated setting data as setting data 470 in the secondary storage apparatus 220.

The preset tour program 440 executes an automatic preset tour by reading the setting data 470 stored in the secondary storage apparatus 220 and controlling the panhead 241 via the panhead control I/F 240 based on the setting data 470. Also, the preset tour program 440 stores the progression status of the preset tour in preset tour data 480. Specifically, in the preset tour data 480, the preset tour program 440 stores the movement time needed for movement between at least two points (between image capture positions indicated by the preset positions) in the preset tour, and the preset tour status information indicating states such as success/failure/skip in the preset tour.

In FIG. 4B, the captured image data 450, the panorama image data 460, and the setting data 470 are stored in the secondary storage apparatus 220 of the camera server 110. Note that the panorama image data 460 and the setting data 470 do not necessarily need to be in the secondary storage apparatus 220 of the camera server 110. For example, as will be described later, they may be in the secondary storage apparatus 320 of the viewer client 120.

The captured image data 450 is image data that was captured using the camera 231 and processed using the image capture program 410. The panorama image data 460 is image data created using processing performed by the panorama image creation program 420.

The setting data 470 is setting data for a preset tour, and is setting values for controlling the operation of the camera server 110, and in particular, it includes attribute information for the movement route (tour route) of a preset tour. Specifically, in addition to setting the values for PTZ of the preset positions, the setting data 470 stores the stop times at the preset positions and the preset tour order.

The preset tour data 480 is data that holds the progression status of a preset tour, and holds the movement time between at least two points in a preset tour and the preset tour status information.

Figure 5A:
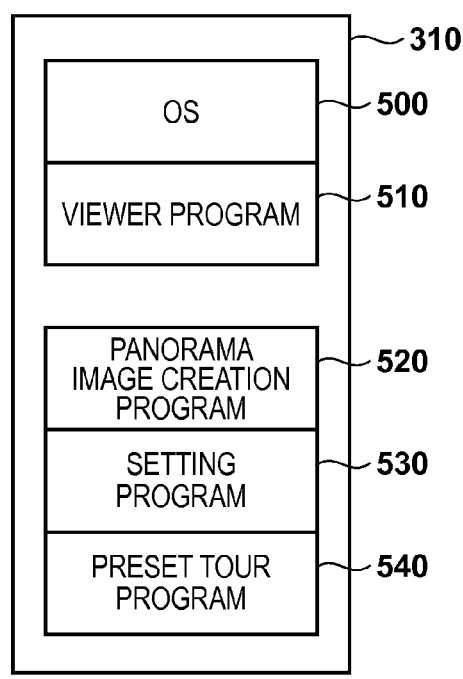
FIGS. 5A and 5B are diagrams showing an example of various types of programs and various types of data of a viewer client.
Figure 5B:
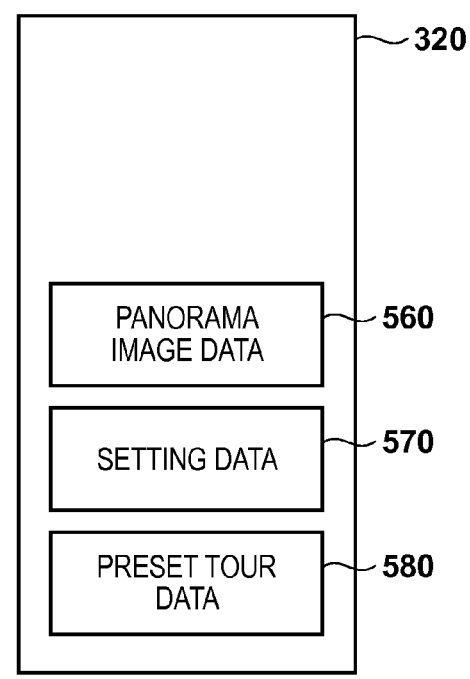

FIGS. 5A and 5B are diagrams showing an example of various types of programs and various types of data stored in the primary storage apparatus 310 and the secondary storage apparatus 320 of the viewer client 120. FIG. 5A shows various types of programs stored in the primary storage apparatus 310 of the viewer client 120, and FIG. 5B shows various types of data stored in the secondary storage apparatus 320 of the viewer client 120.

In FIG. 5A, an OS 500 and a viewer program 510 are loaded in the primary storage apparatus 310. Also, a panorama image creation program 520, a setting program 530, and a preset tour program 540 are loaded as needed in the primary storage apparatus 310.

The OS 500 is a basic program for performing overall control of the viewer client 120. Here, the positions (addresses) in the primary storage apparatus 310 and sizes of various programs (510 to 540) are managed by the OS 500.

On the display apparatus 350, the viewer program 510 displays an image based on captured image data obtained from the camera server 110, the preset tour setting information, and the preset tour progression status. Also, the viewer program 510 includes a function of displaying a user interface on the display apparatus 350. The user can control display of various types of images and information using the user interface. For example, it is possible to control display of moving images/still images, panorama images, preset tour setting information, preset tour progression status information, and the like obtained from the camera server 110.

Note that a CUI (Character-based User Interface), a GUI (Graphical User Interface), an interface provided by a Web application, or the like can be applied as the user interface. Also, the CUI, GUI, or Web application interface here is provided by the setting program 430 (or the setting program 530) of the camera server 110, for example.

The panorama image creation program 520, the setting program 530, and the preset tour program 540 are respectively similar to the panorama image creation program 420, the setting program 430, and the preset tour program 440 in FIG. 4A.

In FIG. 5B, the panorama image data 560 and the setting data 570 may be stored as necessary in the secondary storage apparatus 320 of the viewer client 120. Note that the panorama image data 560 and the setting data 570 are respectively similar to the panorama image data 460 and the setting data 470 in FIG. 4B. The panorama image data 560 is created using the processing performed by the panorama image creation program 520, and the setting data 570 is generated using the processing performed by the setting program 530.

The preset tour data 580 is similar to the preset tour data 480 in FIG. 4B. The preset tour data 580 is generated using the processing performed by the preset tour program 440.

FIG. 6 is a flowchart showing processing executed by a setting program. The processing indicated by the flowchart shown in FIG. 6 is performed by the CPU 200 of the camera server 110 executing the setting program 430 stored in the primary storage apparatus 210, for example. Note that as described above, in the case of a mode in which the setting program 530 is stored in the viewer client 120, the processing of FIG. 6 is performed by the CPU 300 of the viewer client 120 executing the setting program 530 stored in the primary storage apparatus 310. Also, in the present embodiment, it is possible to apply a mode in which the processing is performed on the viewer client 120 side by the viewer client 120 reading the setting data 470 of the camera server 110 via the network 130.

The description below will describe a case in which the setting program is stored in the camera server 110 and the setting program is used to perform processing with the CPU 200 in the camera server 110. However, in the present embodiment, as described above, a mode is possible in which the processing is performed by the CPU 300 on the viewer client 120 side, using the setting program.

First, when the processing in FIG. 6 is started, the CPU 200 of the camera server 110 executes the setting program 430 stored in the primary storage apparatus 210. Then, in S601, the CPU 200 of the camera server 110 reads the setting data 470. Note that if the processing in FIG. 6 is to be performed on the viewer client 120 side, the setting program 530 stored in the viewer client 120 or the setting data 470 of the camera server 110 is read by the CPU 300 via the network 130.

In S602, the CPU 200 of the camera server 110 displays the setting data 470 as a dialog box or the like on the display apparatus of the host (e.g., the viewer client 120). Note that if the processing in FIG. 6 is to be performed on the viewer client 120 side, the display processing is performed by the CPU 300. Since a GUI or the like can be applied as the specific user interface displayed on the display apparatus 350 of the viewer client 120, a description thereof will not be given here.

In S603, the CPU 200 of the camera server 110 performs input/changing (correction) processing on the setting data 470 based on information input via the I/O device 331 from the user, for example. This is realized by values for setting data being edited on a table-format GUI such as that indicated by the example of the setting data 470 shown in FIG. 7, for example. Note that if the processing in FIG. 6 is to be performed on the viewer client 120 side, the input/changing processing is performed by the CPU 300.

In S604, the CPU 200 of the camera server 110 determines whether or not there is an end event for the setting of the setting data 470 input via the I/O device 331, for example. If it is determined that there is no end event (NO in S604), the processing returns to S601.

On the other hand, if it is determined that there is an end event (YES in S604), in S605, the CPU 200 of the camera server 110 stores the setting data 470 processed in S603 in the secondary storage apparatus 220 and thereby sets the setting data 470. Subsequently, the processing ends.

Note that if the processing in FIG. 6 is to be performed on the viewer client 120 side, the determination of whether or not there is an end event in step S604 is performed by the CPU 300. Also, if there is an end event, the processing for storing the setting data 570 in the secondary storage apparatus 320 of the viewer client 120 is performed by the CPU 300.

FIG. 7 is a diagram showing an example of the setting data 470 that was created for the preset tour program 440.

As shown in FIG. 7, values for Pan/Tilt/Zoom are set as presets, which are preset position information for the camera 231, in the setting data 470. Setting a preset and determining the angle of view makes it possible to set any preset position in a 360-degree range. More specifically, Pan is set using 360 degrees, that is, ±180 degrees centered about 0 degrees with the right direction being positive and the left direction being negative, as the total range. Tilt is set from 0 degrees to positive 90 degrees in the up direction. A lens focus distance is set in the Zoom column. Multiple image capture positions for the camera 231 are set by setting the preset positions.

As shown in FIG. 7, each preset is denoted by a preset number. Furthermore, in the setting data 470, the stop times at the preset positions are set in the Pause column. Furthermore, the attribute information of the movement route (tour route) for the preset tour of the camera 231 is set in the Preset Tour Attribute column in the setting data 470. Specifically, the tour order of the presets is set in the Preset Tour Attribute column.

FIG. 7 shows an example in which four preset positions, the stop time (pause) at each preset position, and the tour order of the preset positions are set in the setting data 470.

FIG. 8 is a flowchart showing an example of processing executed by the preset tour program 440. The processing of the flowchart shown in FIG. 8 is performed by the CPU 200 of the camera server 110 executing the preset tour program 440 stored in the primary storage apparatus 210, for example. Note that as described above, in the case of a mode in which the preset tour program 540 is stored in the viewer client 120, the processing of FIG. 8 is performed by the CPU 300 of the viewer client 120 executing the preset tour program 540 stored in the primary storage apparatus 310.

FIG. 9A is a diagram showing an example of the preset tour data 480 created by the preset tour program 440. The preset number, movement time, and status are managed according to the preset tour order in the preset tour data 480.

The example shown in FIG. 9A shows that the preset number at tour order 1 is preset 1, the movement time from preset 4 to the preset 1 is 10 seconds, and the status of tour order 1 is a character string "F", which indicates preset tour completion. The example shown in FIG. 9A shows that the preset 1 at tour order 1 is the first of the preset tour, the preset 4 at tour order 4 is the last of the preset tour, and after the preset 4 at tour order 4, the preset tour returns to the preset 1 at tour order 1.

Similarly, it is shown that the preset number at tour order 2 is preset 3, the movement time from the preset 1 to the preset 3 is "10 seconds", and the status of tour order 2 is the character string "N", which indicates being in the process of executing the preset tour. Also, it is shown that the preset number with tour order 3 is preset 2, and the movement time from the preset 3 to the preset 2 is "5 seconds", and the status of tour order 3 is the character string "NULL", which indicates that touring of the preset has not yet been executed.

Also, it is shown that the preset number with tour order 4 is the preset 4, the movement time from the preset 2 to the preset 4 is "15 seconds", and the status of tour order 4 is the character string "NULL", which indicates that touring of the preset has not yet been executed.

Processing executed by a preset tour program will be described with reference to FIGS. 7, 8, and 9A. According to the preset tour attributes in the setting data 470 shown in FIG. 7, the preset tour program executes the preset tour in the following order: preset 1→preset 3→preset 2→preset 4→preset 1→ . . . .

The description below will describe a case in which a preset tour program is stored in the camera server 110 and the CPU 200 on the camera server 110 side performs the processing using the preset tour program. However, in the present embodiment, as described above, a mode is possible in which the processing is performed by the CPU 300 on the viewer client 120 side, using the preset tour program.

First, when the processing in FIG. 8 is started, the CPU 200 of the camera server 110 executes the preset tour program 440 stored in the primary storage apparatus 210. Then, in S801, the CPU 200 of the camera server 110 reads the setting data 470.

In S802, the CPU 200 of the camera server 110 sets a timer in order to measure the movement time needed for movement between presets. Note that the timer is realized by the CPU 200, for example. In S8028, the CPU 200 of the camera server 110 stores the character string "N", which indicates being in the process of moving to the next preset (executing preset tour), as the preset tour status information in a region linked to tour order 1 of the preset tour data 480, based on the setting data 470 read in S801.

In S803, the CPU 200 of the camera server 110 controls the panhead 241 and the camera 231 in order to move to the preset position at tour order 1, based on the setting data 470 read in step S801. Specifically, in accordance with (0, 45, 30), which is the (P, T, Z) for the preset 1, the panhead 241 is controlled so as to move upward by 45 degrees and the angle of view of the camera 231 is controlled so as to be 30 degrees, and upon completion of movement to the preset position, image capture is performed for 3 seconds.

Also, when movement to the preset position is complete, in S804, the CPU 200 of the camera server 110 reads the elapsed time of the timer so as to measure the movement time between presets. This time is the amount of time from when the timer is set in S802 until when movement to the preset position is complete in S804. In S805, the CPU 200 of the camera server 110 stores the movement time measured in S804 and a character string "F", which indicates preset movement completion (preset tour completion) as the preset tour status information, in a region linked to tour order 1 of the preset tour data 480.

Note that in the present embodiment, the elapsed time of the timer is set in the preset tour data 480 as the preset movement time, but there is no limitation to this. For example, the average of preset movement times that were measured in the past and set in the preset tour data 480 and elapsed times measured by the timer may be obtained and overwritten on the preset tour data 480 as the preset movement time.

In S806, the CPU 200 of the camera server 110 determines whether or not the preset tour has been cycled through. Specifically, it is determined whether or not movement to the final preset in the tour order has ended. If it is determined as a result of the determination that the preset cycle has ended (YES in S806), in S807, the CPU 200 of the camera server 110 changes every piece of preset tour status information stored in the preset tour data 480 to NULL.

On the other hand, if it is determined as a result of the determination that the preset tour has not ended (NO in S806), in S809, the CPU 200 of the camera server 110 determines whether or not there is an end event for control of the preset tour, the event being input via the I/O device 331. If it is determined that there is no end event (NO in S809), the processing returns to S802. On the other hand, if it is determined that there is an end event (YES in S809), the processing ends.

Here, the description of the processing will continue under the assumption that there was no end event.

Upon returning to S802, the CPU 200 of the camera server 110 sets the timer once again. In S8028, the CPU 200 of the camera server 110 stores a character string "N", which indicates being in the process of moving to the next preset (executing preset tour) as the preset tour status information, in a region linked to tour order 2 in the preset tour data 480.

In S803, the CPU 200 of the camera server 110 controls the panhead 241 and the camera 231 in order to move to the preset position at tour order 2, based on the tour order information in the setting data 470. Specifically, in order to move from (0, 45, 30), which is the (P, T, Z) of preset 1, to (170, 80, 20), which is the (P, T, Z) of preset 3, the panhead 241 is controlled so as to move 170 degrees to the right and 35 degrees upward and the angle of view of the camera 231 is controlled to be 20 degrees, and when movement to the preset position is complete, image capture is performed for 10 seconds.

Also, when movement to the preset position is complete, in S804, the CPU 200 of the camera server 110 reads the elapsed time of the timer so as to measure the movement time between presets. In step S805, the CPU 200 of the camera server 110 stores the movement time measured in S804 and a character string "F", which indicates preset movement completion (preset tour completion) as the preset tour status information, in a region linked to tour order 2 of the preset tour data 480.

Hereinafter, the processing is similarly repeated, and the CPU 200 of the camera server 110 uses the preset tour program 440 to execute the preset tour based on the tour order in the setting data 470. Specifically, in order to move from (170, 80, 20), which is the (P, T, Z) of preset 3, to (100, 10, 30), which is the (P, T, Z) of preset 2, the panhead 241 is controlled so as to move 70 degrees to the left and 70 degrees downward, and the angle of view of the camera 231 is controlled to be 30 degrees, and in this state, image capture is performed for 5 seconds. Thereafter, in order to move from (100, 10, 30), which is the (P, T, Z) of preset 2, to (−170, 20, 15), which is the (P, T, Z) of preset 4, the panhead 241 is controlled so as to move 270 degrees to the left and 10 degrees upward, and the angle of view of the camera 231 is controlled to be 15 degrees, and in this state, image capture is performed for 2 seconds.

In the present embodiment, upon completion of movement to preset 4, the CPU 200 of the camera server 110 determines in S806 that the preset tour has ended, and therefore in S807, all of the preset tour status information stored in the preset tour data 480 is changed to NULL.

Thereafter, in accordance with the setting data 470, the preset tour returns to tour order 1 (preset 1). Next, in order to move from (−170, 20, 15), which is the (P, T, Z) of the previous preset 4, to (0, 45, 30), which is the (P, T, Z) of preset 1 according to the preset tour program 440, the CPU 200 of the camera server 110 controls the panhead 241 so that it moves 170 degrees to the right and 25 degrees upward and controls the angle of view of the camera 231 to be 30 degrees, and in this state, image capture is performed for 3 seconds.

Hereinafter, the processing is continually repeated until an event for ending control of the preset tour occurs.

Figure 10:
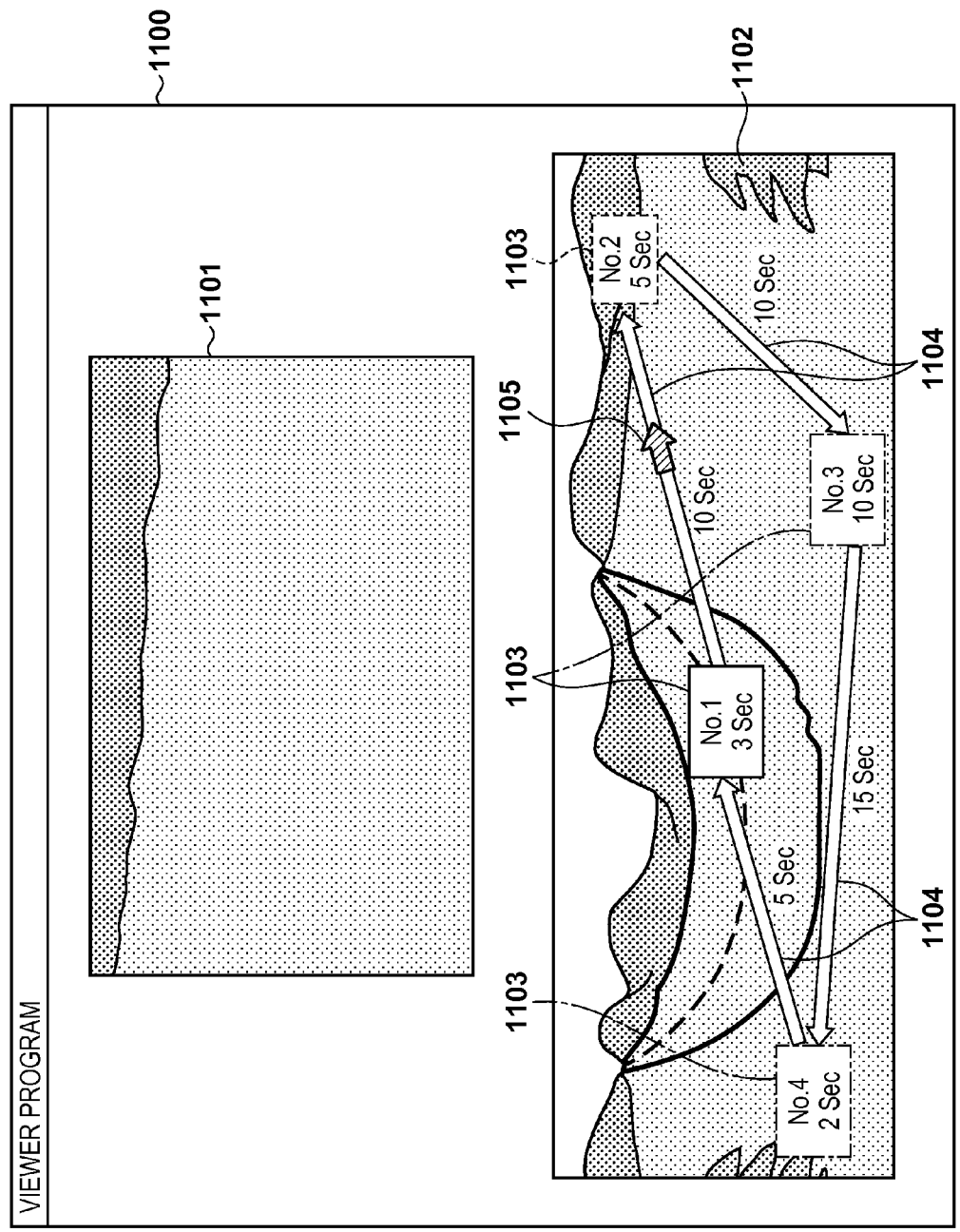
FIG. 10 is a diagram showing an example of a viewer dialog box.

FIG. 10 is a diagram showing an example of a viewer dialog box 1100 displayed by a viewer program 510 on the display apparatus 350. Here, an example of display in the case where the setting data 470 in FIG. 7 and the preset tour data 480 in FIG. 9A have been stored is shown.

In the viewer dialog box 1100, reference numeral 1101 indicates a camera image capture display region in which an image based on the captured image data obtained from the camera server 110 is displayed. In the present embodiment, the camera image capture display region 1101 displays a live image based on captured image data captured by the camera 231 at the location indicated by camera current position icon 1105, which is information indicating the current image capture position of the camera.

Reference numeral 1102 indicates a panorama image display region for the panorama image data 460. In the present embodiment, the panorama image display region 1102 displays a panorama image based on the created panorama image data.

Reference numerals 1103 indicate preset rectangles displayed at the preset positions on the panorama image. Information relating to the preset positions in the setting data 470 and information based on the preset tour data 480 is reflected in the preset rectangles 1103. In the present embodiment, the preset tour order and the stop times at the preset positions are displayed within the frames of the preset rectangles 1103 as pieces of preset information (preset tour setting information and preset tour progression status information), which are the image capture conditions.

Also, a configuration is used in which the mode of displaying the outer frames of the preset rectangles 1103 changes according to the content of the preset tour status. Specifically, if the preset tour status is "preset tour completion", the outer frame line is displayed as a red solid line. Also, if the preset tour status is "executing preset tour", the outer frame is displayed as a blue dotted line. Also, if the preset tour status is "NULL", the outer frame is displayed as a yellow dotted line. Note that the display mode is an example, and there is no limitation thereto, as long as it is a display mode in which the tour order and the preset tour statuses can be identified. For example, it is possible to change the thickness of the outer frame line that is a colored outer frame, and to change the line width and line type (single-dotted chain line, double-dotted chain line, etc.). Also, the outer frame may be changed from a rectangular shape to another shape (e.g., an ellipse, a polygonal shape).

In the present embodiment, since the camera 231 is in the process of moving the location indicated by the camera current position icon 1105, the preset rectangle for tour order 1 (No. 1) is displayed with a red solid-line frame, which indicates "preset tour completion", the preset rectangle for tour order 2 (No. 2) is displayed with a blue dotted-line frame, which indicates "executing preset tour", and the preset rectangles with tour order 3 (No. 3) and tour order 4 (No. 4) are displayed with yellow dotted-line frames.

Reference numeral 1104 indicates a preset movement line indicating the preset movement direction. The preset movement line 1104 is constituted by arrow lines that connect the presets and character strings that indicate the movement times between the presets.

The camera current position icon 1105 is displayed at a position corresponding to the image capture position of the camera at the time when the viewer program 510 obtains the image data and the preset tour data from the camera server 110.

Figure 11:
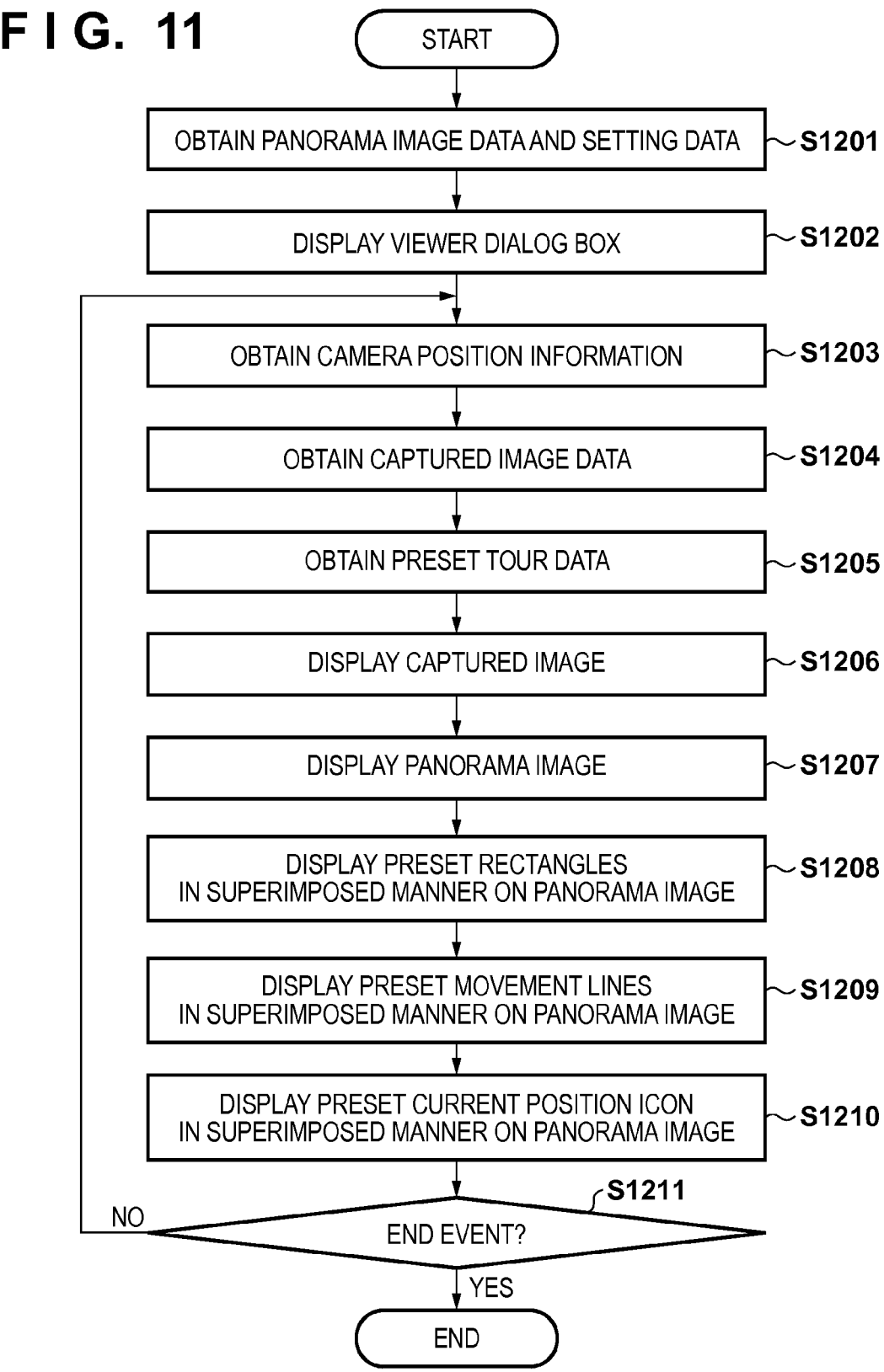
FIG. 11 is a flowchart showing processing performed by a viewer program.

FIG. 11 is a flowchart indicating processing executed by the viewer program 510. The processing in the flowchart shown in FIG. 11 is performed by the CPU 300 of the viewer client 120 executing the viewer program 510 in the primary storage apparatus 310, for example.

Processing by which the viewer program 510 displays preset tour setting information and displays preset tour progression status information will be described below with reference to FIGS. 10 and 11. Note that in the present embodiment, it is assumed that the setting data 470 shown in FIG. 7 is created for the preset tour program 440.

First, when the processing in FIG. 11 is to be started, the CPU 300 of the viewer client 120 executes the viewer program 510 stored in the primary storage apparatus 310. Then, in S1201, the CPU 300 of the viewer client 120 obtains the panorama image data 460 and the setting data 470 (shown in FIG. 7) from the camera server 110. In S1202, the CPU 300 of the viewer client 120 displays the viewer dialog box 1100. At this time, nothing is displayed in the camera image capture display region 1101 and the panorama image display region 1102 of the viewer dialog box 1100.

In S1203, the CPU 300 of the viewer client 120 obtains the camera position information (image capture position information), which indicates the current position of the camera 231, from the camera server 110. In the present embodiment, (P, T, Z) are obtained as the current camera position information. In S1204, the CPU 300 of the viewer client 120 obtains the captured image data 450 from the camera server 110. In S1205, the CPU 300 of the viewer client 120 obtains the preset tour data 480 (FIG. 9A) from the camera server 110. The order in which S1203, S1204, and S1205 are executed can be switched.

In S1206, the CPU 300 of the viewer client 120 displays the captured image data 450 obtained in S1204 by overwriting it on the camera captured image display region 1101 of the viewer dialog box 1100. In S1207, the CPU 300 of the viewer client 120 displays the panorama image according to the panorama image data 460 obtained in S1201 by overwriting it on the panorama image display region 1102 of the viewer dialog box 1100.

In step S1208, the CPU 300 of the viewer client 120 displays the preset rectangles 1103 at the preset positions on the panorama image. At this time, the viewer program 510 performs display by changing the display mode of the outer frames of the preset rectangles according to the preset tour status information included in the preset tour data 480 obtained in S1205. Also, at this time, the viewer program 510 displays the tour order and the stop times at the preset positions in the preset rectangle frames. As shown in FIG. 10, in the present embodiment, the viewer program 510 displays the four preset rectangles 1103 in a superimposed manner on the panorama image.

In S1209, the CPU 300 of the viewer client 120 displays the preset movement lines 1104 in a superimposed manner on the panorama image based on the preset positions and the preset tour order included in the setting data 470 and the preset tour data 480. At this time, the viewer program 510 displays the movement times included in the preset tour data 480 obtained in S1205 as character strings. As shown in FIG. 10, in the present embodiment, the viewer program 510 displays the four preset movement lines 1104 in a superimposed manner on the panorama image. For example, the fact that the movement time from the preset position at preset tour order 1 to the preset position of preset tour order 2 is 10 seconds is displayed.

In S1210, the CPU 300 of the viewer client 120 displays the camera current position icon 1105 in a superimposed manner on the panorama image at the current camera location obtained in S1203. In the present embodiment, the display location of the camera current position icon is specified based on the current camera position information obtained from the camera server 110, but there is no limitation to this. For example, the current camera position information may be specified by calculation using the movement time included in the preset tour data 480 and the elapsed time since the previous preset tour completion time.

Note that the order in which S1208, S1209, and S1210 are executed can be switched. Also, S1206 may be executed after executing these three processes.

In S1211, the CPU 300 of the viewer client 120 determines whether or not there is a processing end event input via the I/O device 331, for example. If it is determined that there is no end event (NO in S1211), the processing returns to S1203. On the other hand, if it is determined that there is an end event (YES in S1211), the processing ends.

Next, processing in a case where a preset tour is skipped (a preset tour is prohibited) in a monitoring camera system will be described. For example, if any of the preset rectangles 1103 on the panorama image is clicked on using a mouse in the viewer dialog box 1100 in FIG. 10, the viewer program 510 skips the preset that is the next tour destination. For example, in the case where the camera image capture position is between the preset position with tour order 1 and the preset position with tour order 2, if the preset rectangle 1103 with tour order 3 is clicked on with a mouse, touring of the preset with tour order 2, which is the next tour destination, will be canceled, and movement to the preset position with tour order 3 will be started.

Figure 12:
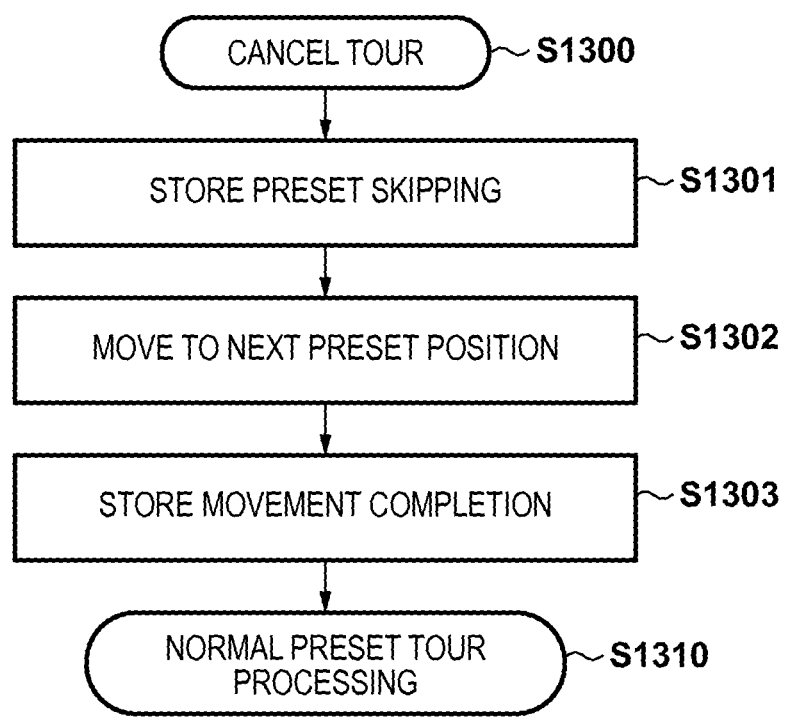
FIG. 12 is a flowchart showing processing performed by a viewer program in a case where touring of a preset is skipped.

Hereinafter, processing in that case will be described. FIG. 12 is a flowchart indicating processing executed by the viewer program 510. The processing in the flowchart shown in FIG. 12 is performed by the CPU 300 of the viewer client 120 executing the viewer program 510 in the primary storage apparatus 310, for example.

If the user clicks on the preset rectangle 1103 with tour order 3 with a mouse, the viewer program 510 performs notification of a tour cancel event to the preset tour program 440.

Upon receiving the tour cancel event (S1300), the preset tour program 440 stores a character string "S", which indicates skipping of movement to a preset, as the preset tour status in a region linked to the tour order that was being moved to (tour order whose status was "N") (S1301). If skipping is instructed during movement from the preset position with tour order 1 to the preset position with tour order 2, the character string "S" is stored in the region linked to tour order 2 in the preset tour data 480. In other words, the status of the preset position with tour order 2 is re-written from "N" to "S".

Next, the preset tour program 440 starts the movement to the preset position whose tour order is subsequent to the skipped tour order (S1302). In the present embodiment, movement to the preset position with tour order 3, which was designated by a mouse click, is started. Then, the preset tour program 440 stores the character string "N", which indicates being in the process of moving to the next preset tour, as the preset tour status in the region linked to tour order 3. FIG. 9B is a diagram showing an example of the preset tour data 480 created by the preset tour program at this time.

Upon completion of movement to the preset position with tour order 3, the preset tour program 440 stores the character string "F", which indicates preset movement completion, as the preset tour status information in the region linked to tour order 3 of the preset tour data 480 (S1303).

Thereafter, the preset tour program 440 repeats normal preset tour processing (S1310). That is to say, image capture is performed for the pause time (10 seconds) set in the preset position (preset number 2) with tour order 3, and the image capture position moves to the preset position with tour order 4.

On the other hand, in S1205 of the preset tour progression status display processing, if the character string "S", which indicates tour skipping, is included in the preset tour status information of the preset tour data 480 obtained from the camera server 110, the viewer program 510 displays a red X-framed preset rectangle in a superimposed manner on the panorama image. FIG. 13 is a diagram showing an example of the viewer dialog box 1100 displayed by the viewer program 510 at this time. As shown in FIG. 13, the preset rectangle 1103 with tour order 2 (No. 2) is displayed with a red X-frame.

Although the present embodiment has described a configuration in which the progression status of the preset tour is displayed on the panorama image, there is no limitation to this. For example, it is possible to display the preset tour setting information and preset tour progression status as image capture conditions on a captured image in which all of the captured images within a range in which the camera can perform image capture are in one screen, such as an overall view screen.

Also, although the present embodiment has described a configuration in which the preset tour progression status is displayed, there is no limitation to this. For example, the present invention may be applied to display of a progression status relating to camera position movement other than a preset tour.

Furthermore, as the image capture condition information indicating the image capture conditions, image capture information that can be obtained from a camera, such as the preset values (PTZ), camera sensitivity information, resolution information, and date and time information may be displayed as needed.

For example, the present invention may be applicable to a monitoring camera system that includes a function of designating a camera movement destination by mouse-clicking any location on the panorama image display region displayed by the viewer program. In this case, the current camera position is displayed on the panorama image display region of the viewer program using a rectangle with a red frame, and the movement destination designated by mouse click is displayed using a rectangle with a blue dotted-line frame, for example. Also, the progression status of movement from the current position to the movement destination position designated by mouse click is displayed by displaying the current camera position icon in a superimposed manner on the panorama image.

As described above, according to the present embodiment, the camera setting state (preset tour setting information and preset tour progression status) can be visibly presented by the viewer program, and convenience to a person in charge of monitoring can be improved. Also, in the case where a preset tour is skipped as well, the preset tour progression state is visible, which improves the convenience to the person in charge of monitoring.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083104, filed Apr. 14, 2014, which is hereby incorporated by reference herein in its entirety.

What is claimed is:

1. A display processing apparatus for displaying, on a display device, an image captured by an image capture apparatus capable of changing an image capture direction, the display processing apparatus comprising:
a receiver configured to receive an image captured by the image capture apparatus from the image capture apparatus while the image capture apparatus captures a plurality of images in a plurality of image capture directions by changing an image capture direction; and
a processor configured to perform first display processing for displaying the image received by the receiver in a first region of the display device, and second display processing for performing, according to the image capture direction in which the received image was captured, display in a second region of the display device indicating a range in which the image capture apparatus can perform image capture by changing the image capture direction,
wherein the first region of the display device and the second region of the display device are different regions of the display device.

2. The apparatus according to claim 1, wherein
from the image capture apparatus, the receiver receives the image captured by the image capture apparatus while changing the image capture direction to a target direction, and
the processor performs third display processing for performing, according to the target direction, display in the second region indicating the range in which the image capture apparatus can perform image capture by changing the image capture direction.

3. The apparatus according to claim 1, wherein
from the image capture apparatus, the receiver receives the image captured by the image capture apparatus by means of image capture in which the image capture direction is changed cyclically between a plurality of image capture directions, and
the processor performs third display processing for performing display in the second region according to the plurality of image capture directions.

4. The apparatus according to claim 1, wherein
the receiver receives the image capture direction in which an image is captured and a captured image from the image capture apparatus, and
based on the image capture direction received by the receiver, the processor performs the second display processing for performing, according to the image capture direction, display in the second region.

5. A display method for displaying, on a display device, an image captured by an image capture apparatus capable of changing an image capture direction, the method comprising:
performing first display processing for displaying the image captured by the image capture apparatus in a first region of the display device while the image capture apparatus captures a plurality of images in a plurality of image capture directions by changing the image capture direction; and
performing second display processing for performing, according to the image capture direction in which the captured image was captured, display in a second region of the display device indicating a range in which the image capture apparatus can perform image capture by changing the image capture direction,
wherein the first region of the display device and the second region of the display device are different regions of the display device.

6. The method according to claim 5, wherein
with the first display processing, the image captured by the image capture apparatus while changing the image capture direction to a target direction is displayed in the first region, and
third display processing for performing display in the second region indicating the range in which the image capture apparatus can perform image capture by changing the image capture direction is further performed according to a target direction.

7. The method according to claim 5, wherein
with the first display processing, the image captured by the image capture apparatus using image capture in which the image capture direction is changed cyclically between a plurality of image capture directions is displayed in a first region of the display device, and
third display processing for performing display in the second region according to a plurality of image capture directions is performed.

8. A non-transitory computer-readable storage medium storing computer executable instructions for displaying, on a display device, an image captured by an image capture apparatus capable of changing an image capture direction, wherein the computer executable instructions instruct a microprocessor to perform the following steps:
performing first display processing in which an image captured by the image capture apparatus is displayed in a first region of the display device while the image capture apparatus captures a plurality of images in a plurality of image capture directions by changing the image capture direction, and
performing second display processing for performing, according to the image capture direction in which the captured image was captured, display in a second region that indicates a range in which the image capture apparatus can perform image capture by changing the image capture direction, wherein the first region of the display device and the second region of the display device are different regions of the display device.

9. The non-transitory computer-readable storage medium according to claim 8, wherein with the first display processing, the image captured by the image capture apparatus while changing the image capture direction to a target direction is displayed in a first region, and third display processing for performing display in the second region indicating the range in which the image capture apparatus can perform image capture by changing the image capture direction is further performed according to a target direction.

10. The non-transitory computer-readable storage medium according to claim 8, wherein with the first display processing, the image captured by the image capture apparatus using image capture in which the image capture direction is changed cyclically between a plurality of image capture directions is displayed in a first region of the display device, and third display processing for performing display in the second region, according to a plurality of image capture directions, is performed.

11. A display processing apparatus for displaying, on a display device, an image captured by an image capture apparatus capable of changing an image capture direction, the display processing apparatus comprising:

a storage device; and a processor configured to execute computer executable instructions recorded on the storage device, the computer executable instructions including instructions, that when executed by the processor, cause the display processing apparatus to:

obtain data for an image capture order of a plurality of image capture directions; and perform, based on the data for the image capture order, display processing for providing, in a region indicating a range in which the image capture apparatus can perform image capture by changing the image capture direction, a first display element according to a first image capture direction among the plurality of image capture directions, a second display element according to a second image capture direction in which an image is captured subsequent to the first image capture direction, and a third display element that indicates that the image capture direction is changed from the first image capture direction to the second image capture direction.

12. The apparatus according to claim 11, wherein image capture is performed cyclically by a plurality of image capture apparatuses in the plurality of image capture directions.

13. The apparatus according to claim 11, wherein the display processing apparatus is caused to obtain the data for the image capture order from the image capture apparatus.

14. The apparatus according to claim 11, wherein in the region, the display processing apparatus is caused to provide the first display element that further indicates the image capture order of the first image capture range, and the second display element that further indicates the image capture order of the second image capture range.

15. The apparatus according to claim 11, wherein the display processing apparatus is caused to provide a fourth display element that indicates time for moving the image capture direction from the first image capture direction to the second image capture direction.

16. The apparatus according to claim 11, wherein in a case where image capture in the second image capture range is skipped, the display processing apparatus is caused to change the second display element.

17. A display processing method for displaying, on a display device, an image captured by an image capture apparatus capable of changing an image capture direction, the display processing method comprising:

providing, in a region indicating a range in which the image capture apparatus can perform image capture by changing the image capture direction, a first display element according to a first image capture direction among a plurality of image capture directions, and a second display element according to a second image capture direction in which an image is captured subsequent to the first image capture direction, and providing a third display element that indicates that the image capture direction is changed from the first image capture direction to the second image capture direction.

18. The method according to claim 17, wherein a fourth display element is further provided to indicate time for moving the image capture direction from the first image capture direction to the second image capture direction.

19. A non-transitory computer-readable storage medium storing computer executable instructions for displaying, on a display device, an image captured by an image capture apparatus capable of changing an image capture direction, wherein the computer executable instructions instruct a microprocessor to perform the following steps:

providing, in a region indicating a range in which the image capture apparatus can perform image capture by changing the image capture direction, a first display element according to a first image capture range among a plurality of image capture directions, and a second display element according to a second image capture direction in which an image is captured subsequent to the first image capture direction, and performing display processing for providing a third display element that indicates that the image capture direction is changed from the first image capture direction to the second image capture direction.

20. The non-transitory computer-readable storage medium according to claim 19, wherein a fourth display element is further provided to indicate time for moving the image capture direction from the first image capture direction to the second image capture direction.

* * * * *